(12) United States Patent
Kesten

(10) Patent No.: US 7,396,193 B2
(45) Date of Patent: Jul. 8, 2008

(54) DUST COLLECTOR FOR DRILL

(76) Inventor: Douglas Kesten, 320 W. 30th Street 4K, New York, NY (US) 10001

( * ) Notice: Subject to any disclaimer, the term of this patent is extended or adjusted under 35 U.S.C. 154(b) by 108 days.

(21) Appl. No.: 11/435,343

(22) Filed: May 15, 2006

(65) Prior Publication Data

US 2007/0264092 A1 Nov. 15, 2007

(51) Int. Cl.
*B23B 47/34* (2006.01)
(52) U.S. Cl. ......................................... 408/67
(58) Field of Classification Search ................... 408/67; 409/137; 144/251.1; 451/453; 15/300.1, 15/344, 345, 347, 410; *B23B 47/34, 45/00, B23B 45/14; B23Q 11/00*
See application file for complete search history.

(56) References Cited

U.S. PATENT DOCUMENTS

| 3,936,213 | A | * | 2/1976 | Kappel | ........................ | 408/67 |
| 5,034,041 | A | * | 7/1991 | Austin | ........................ | 55/385.1 |
| 6,193,448 | B1 | * | 2/2001 | Brennan | ...................... | 408/67 |
| 7,175,371 | B2 | * | 2/2007 | Vidal | .......................... | 408/1 R |
| 2004/0141820 | A1 | * | 7/2004 | Mikon et al. | ................... | 408/67 |
| 2005/0000052 | A1 | * | 1/2005 | Byles | ............................ | 15/314 |
| 2007/0243031 | A1 | * | 10/2007 | Yun | ............................. | 408/67 |

FOREIGN PATENT DOCUMENTS

| DE | 3140776 | A1 | * | 4/1983 |
| DE | 29609060 | U1 | * | 8/1996 |
| DE | 19513748 | A1 | * | 10/1996 |
| EP | 1714735 | A1 | * | 10/2006 |
| FR | 2763528 | A1 | * | 11/1998 |
| GB | 2067106 | A | * | 7/1981 |
| GB | 2096029 | A | * | 10/1982 |
| GB | 2096030 | A | * | 10/1982 |
| GB | 2159619 | A | * | 12/1985 |
| GB | 2343645 | A | * | 5/2000 |
| JP | 2003136362 | A | * | 5/2003 |

\* cited by examiner

*Primary Examiner*—Daniel W Howell
(74) *Attorney, Agent, or Firm*—Schiff Hardin LLP

(57) ABSTRACT

A dust collector for a power drill is provided that includes a cylinder of sufficient size to accept at least a foremost portion of a power drill. The cylinder includes a gasket or seal at the forward end for contact with the wall or working surface to be drilled. A rubber or other elastic membrane or web is provided over the opposite end of the cylinder and an opening is formed in the membrane or web to fit snugly around the forward end of a power drill. A narrowing or neck may be used in place of the web to provide an opening for the forward end of a power drill. An arrangement of holes is formed in the wall of the cylinder. A vacuum hose is connected to the cylinder by a direct connection to the cylinder or by connection of the vacuum hose to a pistol grip handle attached to the cylinder. By connecting the vacuum hose to a shop vacuum, household vacuum or other vacuum source, the power drill may be inserted into the opening in the web and holes drilled in walls or other surfaces without disbursing dust into the surrounding area.

14 Claims, 4 Drawing Sheets

DUST COLLECTOR FOR DRILL

BACKGROUND OF THE INVENTION

1. Field of the Invention

The present invention relates generally to a dust-collecting apparatus for use with a drill and in particular to a vacuum-operated dust collector adapted to fit onto a power drill.

2. Description of the Related Art

Use of a power drill in which is mounted a high-speed drill bit results in the generation of debris and dust as a hole is drilled into a surface. For some materials such as wood the debris is easily collected near the drilling site after drilling is completed. However, for other materials such as gypsum board, or as it is commonly referred to, drywall, fine dust particles spread through the air and accumulate on services over a widespread area. The dust from drilling into drywall is not only troublesome to clean up following maintenance work or installation of new lights, for example, but is also potentially damaging to valuables around the area of the drilling. For example, it is common that art collections and other collections of valuable items in homes, private institutions, and museums, are lit by specialized lightings such as directional lighting, lighting of a particular color temperature or subdued lighting for light sensitive items. Further, it is not uncommon that the high value of such items necessitate their protection with security systems including motion detectors, video cameras or other security devices. Installation of such security devices frequently involves the drilling of holes into the walls and other surfaces in the area where the valuables are kept. The resulting dust from the drilling can adhere to the unprotected surfaces of the valuables, thereby necessitating removing or covering the valuables.

Not only does dust from drilling drywall permeate the air, but many other types of dust such as concrete dust, asbestos fiber or other types of particulates, can be carried in the air and scatter about onto nearby surfaces. Even when less valuable items are in the area around the maintenance work, it is necessary to clean the dust and debris which results from the drilling. It possible that the dust and debris of drilling and working some materials may be harmful should the dust be carried into the air. The dust from some plasters and drywall can harm paintings, for example. Others can be harmful when inhaled.

SUMMARY OF THE INVENTION

The present invention provides an apparatus for preventing the distribution of dust and debris during drilling. In particular, an apparatus is provided that fits onto a standard power drill or other power tool as used by persons performing maintenance or installation work in a dwelling or other interior space and which uses a standard vacuum source, the device being constructed to press against the surface being drilled and to collect substantially all dust and debris created during the drilling operation.

The device includes a transparent cylinder of a sufficient diameter to accept at least the chuck and front portion of the power drill. A gasket or other seal is provided at the forward end of the cylinder for contact with the wall or other surface being drilled. A flexible boot or web is mounted on the opposite end of the cylinder and an opening is formed in the boot or web which accepts and fits snugly about with the forward portion of the power drill. A vacuum source such as a shop vacuum or other vacuum is connected to the cylinder by a flexible hose.

In another embodiment, a pistol grip is provided on the cylinder. The vacuum source is connected to the pistol grip, combining the vacuum outlet with a means for stabilizing the device while in use. Rather than mounting a flexible boot or web on the cylinder to accept and fit snugly about the forward portion of the power drill, the cylinder in this embodiment has a narrowing or neck into which the forward portion of the power drill may be placed.

DETAILED DESCRIPTION OF THE PREFERRED EMBODIMENTS

The present invention provides a dust collector for use with power tools, such as power drills or other power equipment. It is envisioned that the present apparatus may be used with a variety of power hand tools, including saws such as reciprocating saws, high speed rotary tools such as made by Dremel and others, sanders, sandblasting and etching tools, and the like.

Figure 1:
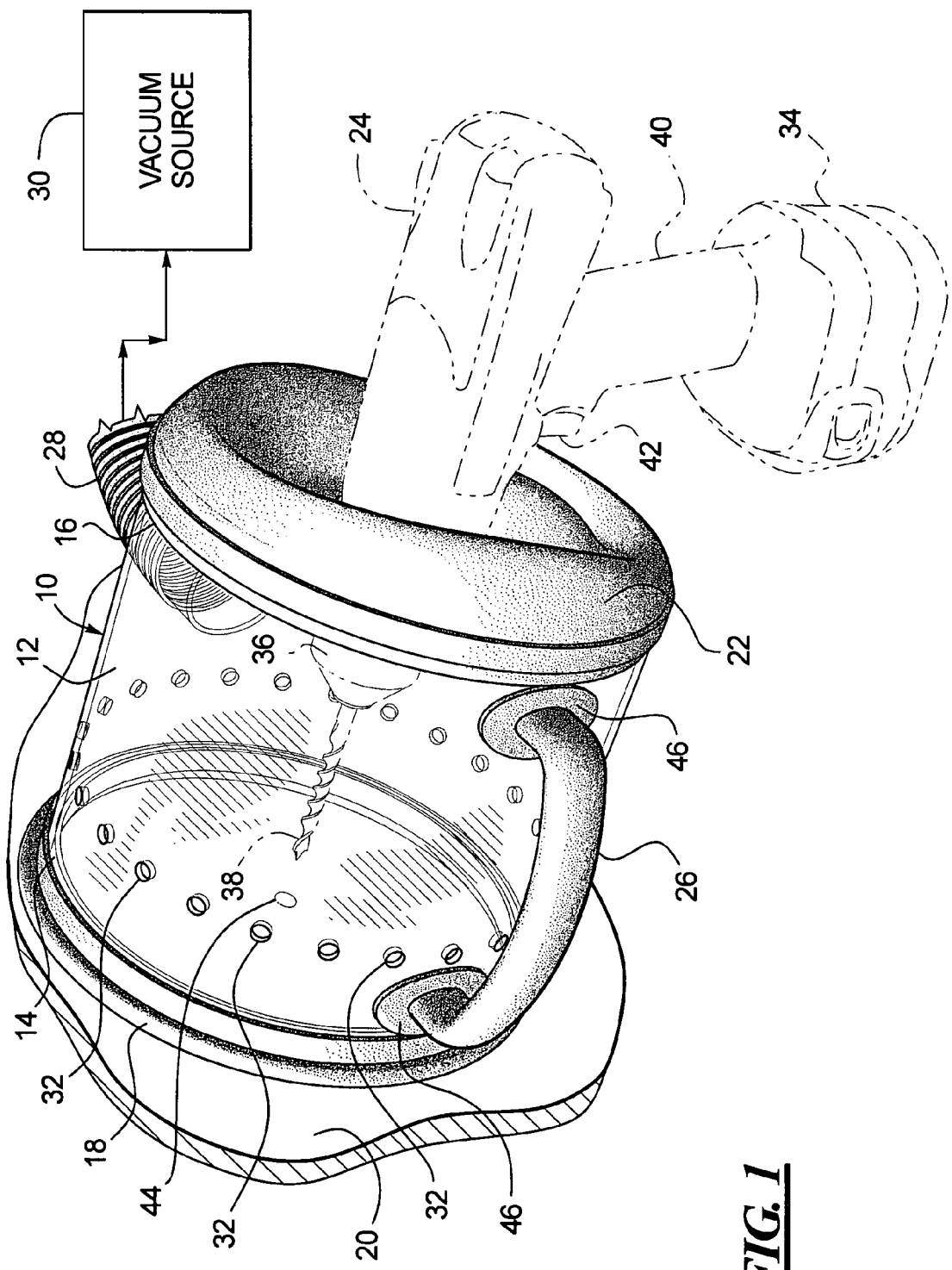
FIG. 1 is a side perspective view of a dust collecting apparatus according to the principles of the present invention, the device being used with a power drill, as shown in phantom.

With reference first to FIG. 1, a dust collecting apparatus 10 includes a cylinder 12 having a first end 14 and a second end 16. The first end 14 of the cylinder 12 include a gasket 18 that presses against a wall, ceiling, or other surface 20. The second end 16 has a flexible web or boot 22. The web 22 fits onto a power drill 24, which is shown in phantom. A handle 26 is provided on the side of the cylinder 12 so that the device can be pressed against the wall or ceiling 20. A hose 28 is connected to the cylinder 12, the hose 28 being connected at its opposite end to a vacuum source 30. An arrangement of holes 32 are provided in the cylinder 12 to let in air drawn in by the vacuum source 30.

The power drill 24 may be any type of power drill and even may be a non-powered hand drill. Here, the power drill 24 is shown as a battery powered drill having a battery pack 34. The drill 24 has a chuck 36 at the forward end which holds a drill bit 38. The drill 24 is operated, as is well known, by grasping a handle 40, pressing on a trigger or other switch 42 so that the drill bit 38 spins, and then moving the bit 38 towards a surface to form a hole or bore 44. If used without the present dust collecting device 10, this results in the dust and debris from the drilling operation leaving a mess in the area. As noted above, some materials produce fine dust that is distributed about the area, potentially causing damage or at least requiring clean up.

The hole or bore 44 formed by the present device is dependent on the size of the drill bit 38 being used. For most jobs, the hole will be less than one half inch. But it is possible in some jobs that large diameter holes are required, so a large diameter drill, hole saw, or other drilling tool is used. If the hole saw or drilling tool fits within the cylinder 12, it may be used with the same device as is used for the smaller holes. If a larger hole saw is to be used, a larger diameter cylinder may be provided for the present dust collector, as will be discussed herein below.

The dust collecting device 10 is positioned on the power drill 24 and pressed against the surface 20 to be drilled so that the gasket 18 is in contact with the surface 20. The device 10 is held by the handle 26 and is easily positioned and pressed against the surface 20 with one hand while the user's other hand holds and operates the drill 24. The cylinder 12 is of a transparent material so that the position of the hole 44 to be bored and the position of the drill bit 38 can be readily seen. The vacuum source 30 is operated prior to starting of the drilling operation to ensure that any dust and debris generated by the drilling is collected. The vacuum source 30 may be turned on just prior to starting to drill or may be left on while drilling several holes.

The vacuum source 30 may be a vacuum cleaner, so-called shop vacuum, or other type of vacuum source. The operation of the vacuum source 30 causes air to be drawn in at the holes 32, which entrains any dust and debris from drilling and carries it through the hose 28 to the vacuum source 30. Preferably, the vacuum source 30 has a dust collecting device, such as a bag or other container so that the dust is prevented from being dispersed.

As the drilling operation is performed, the power drill 24 is moved toward the wall or surface 20. The web 22 is flexible and not only permits movement of the drill 24 relative to the cylinder 12 but preferably provides little or no resistance to movement of the drill 24 as the bit moves into the bore 44 and then is withdrawn. The flexible web 22 also permits the drill 24 to be positioned at an angle to the wall or surface 20 if desired and permits at least some freedom to drill a hole at a different position without moving the cylinder 12. Thus, the dust collector 10 does not interfere with the operation and use of the power drill 24 and permits the user to use the drill as he or she would without the dust collector, but without the risk of dust being spread.

The air flow generated by the vacuum source 30 is preferably sufficiently high to cause the cylinder 12 to be drawn against the surface 20. The gasket 18 ensures that little air flows between the end 14 of the cylinder 12 and the surface 20 for relatively smooth surfaces. For rough or uneven surfaces, such as paneling having grooves formed therein, or textured wall or ceiling surfaces, the gasket 18 is preferably pliable enough to fill at least some of the gaps between the cylinder and the wall surface 20, and escape of dust through any remaining gaps is prevented the by the inflowing air as a result of the vacuum source 30.

The handle 26 as shown in FIG. 1 extends generally parallel to the axis of the cylinder 12. The handle 26 as illustrated is rigid and attaches to the body of the cylinder at mounts 46. The mounts 46 distribute any forces on the handle 26 across the surface of the cylinder 12. The mounts 46 may be integral with the handle 26 or may be a separate part. The user is able to control the position and placement of the cylinder 12 using the handle 26 and can apply a pressing force to press the first end 14 of the cylinder onto the surface 20. In an alternative embodiment, the handle extends in a direction transverse to the axis of the cylinder 12. The handle may be positioned or angled at nearly any angle. It is foreseeable that the handle may be changeable to different angles or positions to fit the needs of the user. It is also foreseeable that multiple handles may be provided at different positions and angles.

The handle 26 of a preferred embodiment is molded in one piece with the body of the cylinder 12. This eliminates the need to attach the handle in a separate assembly step. In another embodiment, the handle 26 is affixed to the cylinder by any of a variety of affixing means. For example, the handle 26 may be glued, or fastened with screws or bolts or rivets, or affixed by a friction fit to mounting pegs formed on the cylinder. The handle 26 may have a non-slip coating or grip applied to prevent slipping of the device while in use or to provide cushioning to the user's hands. The handle 26 may be formed of the cushioning or pliable material. It is also envisioned that the handle may be flexible rather than rigid, and shaped so that the user's hand may be slipped under the handle to grasp the cylinder directly, in much the same way that a hand strap on a small video camera fits along the back of the user's hand.

In an alternative embodiment, the handle may be eliminated. For example, the present device may be formed in different sizes and devices having smaller sized cylinders may be cradled in the hand and would not require a handle. A textured outer surface may be provided at least at some portions of the surface to prevent slipping.

Figure 2:
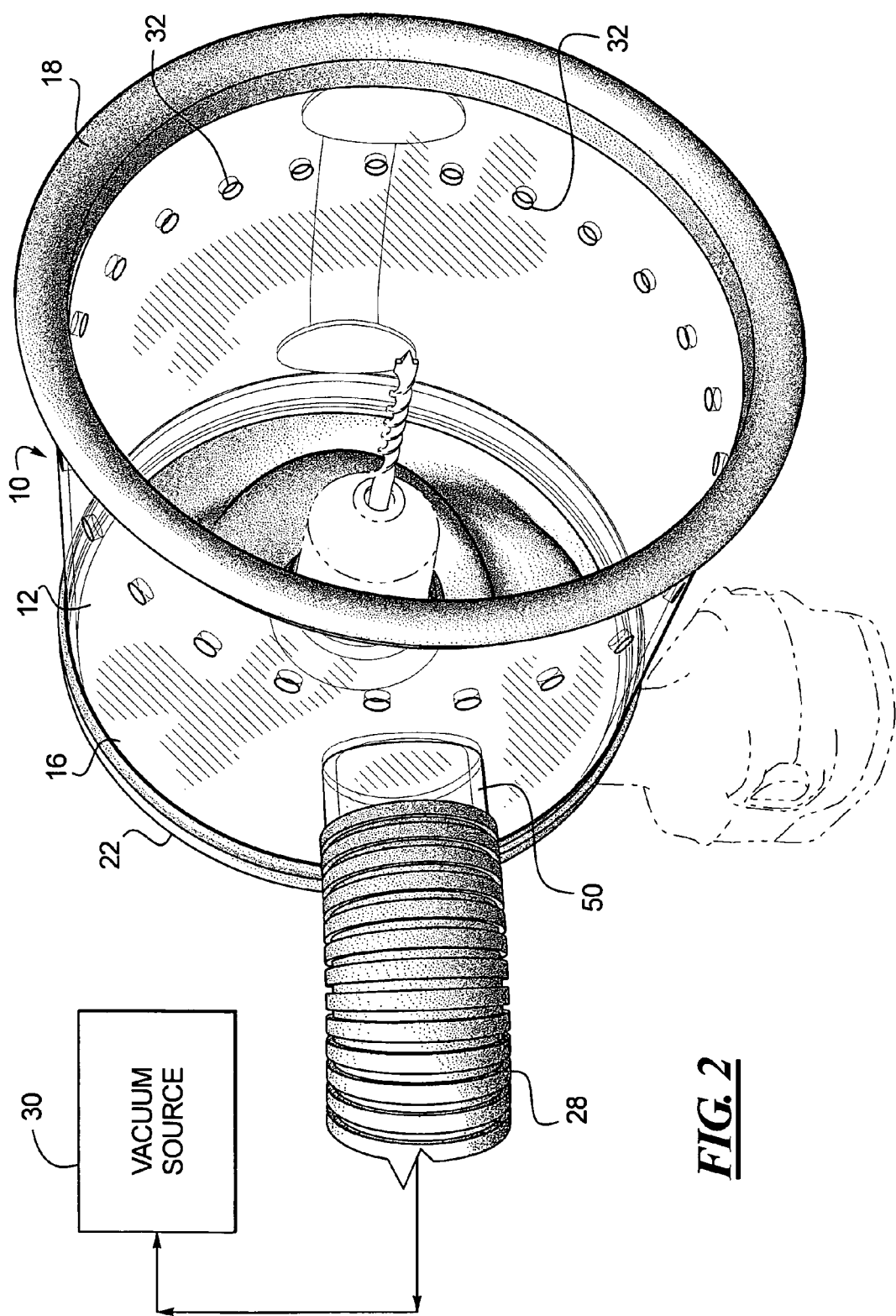
FIG. 2 is an end perspective view of the present dust collecting apparatus with the power drill shown in phantom.

Turning now to FIG. 2, the hose 28 is connected from the vacuum source 30 to the cylinder 12. In a preferred embodiment, the hose 28 is a corrugated vacuum hose of the type commonly used on vacuum cleaners and the like. The hose 28 is flexible and is of sufficient length to extend from the cylinder 12 while it is in use to a conveniently placed vacuum source. In one embodiment, the hose 28 is often feet in length to enable the device to reach the ceiling in a room. In a preferred embodiment, the vacuum hose 28 is connected to a hose outlet 50 extending from the cylinder 12. The hose outlet 50 accepts a 1.25 inch tapered hose fitting. For example, commonly available tapered male and female fittings are provided for connection between the hose 28 and cylinder 12. Other hose connections are also possible.

It is preferred that the hose fitting swivels so that the hose 28 does not become twisted during use and the device is thereby easier to use in different positions on a surface. It is also foreseen to provide a swiveling right angle connector between the hose 28 and the connector 50 so that the hose may swivel to a vertical position while drilling a wall, such as at a right angle to the axis of the cylinder, and so that the hose 28 may swivel to a vertical position parallel to the axis of the cylinder while the device is being used to drill into a ceiling. The preferred hose connector fits readily available vacuum hoses so that no special equipment is required to connect the present device to a commonly available vacuum source 30.

The holes 32 in the cylinder 12 in one embodiment are ⅛ inch in diameter. The holes 32 may be in many different sizes and arrangements, but in one embodiment they are arranged evenly spaced around the cylinder so that 33 such holes are provided, all at a predetermined distance from the first end 14. It is contemplated that the holes 32 could be made smaller, such as holes having a diameter of 3/32 of a inch.

The air flow through the holes 32 is such that the interior of the cylinder 12 is under a negative pressure when the first end 14 of the cylinder is placed against a surface 20. To provide the negative pressure, the vacuum source 30 has to provide sufficient air flow. In one example, a vacuum source producing an air flow of about 100 CFM is connected to the hose 28. Small household vacuums or even larger shop vacuums work well in this application. The negative pressure helps to hold the cylinder 12 against the surface 20, as well as insuring that any gap or opening has a stream of inflowing air that prevents escape of any dust or debris.

Figure 3:
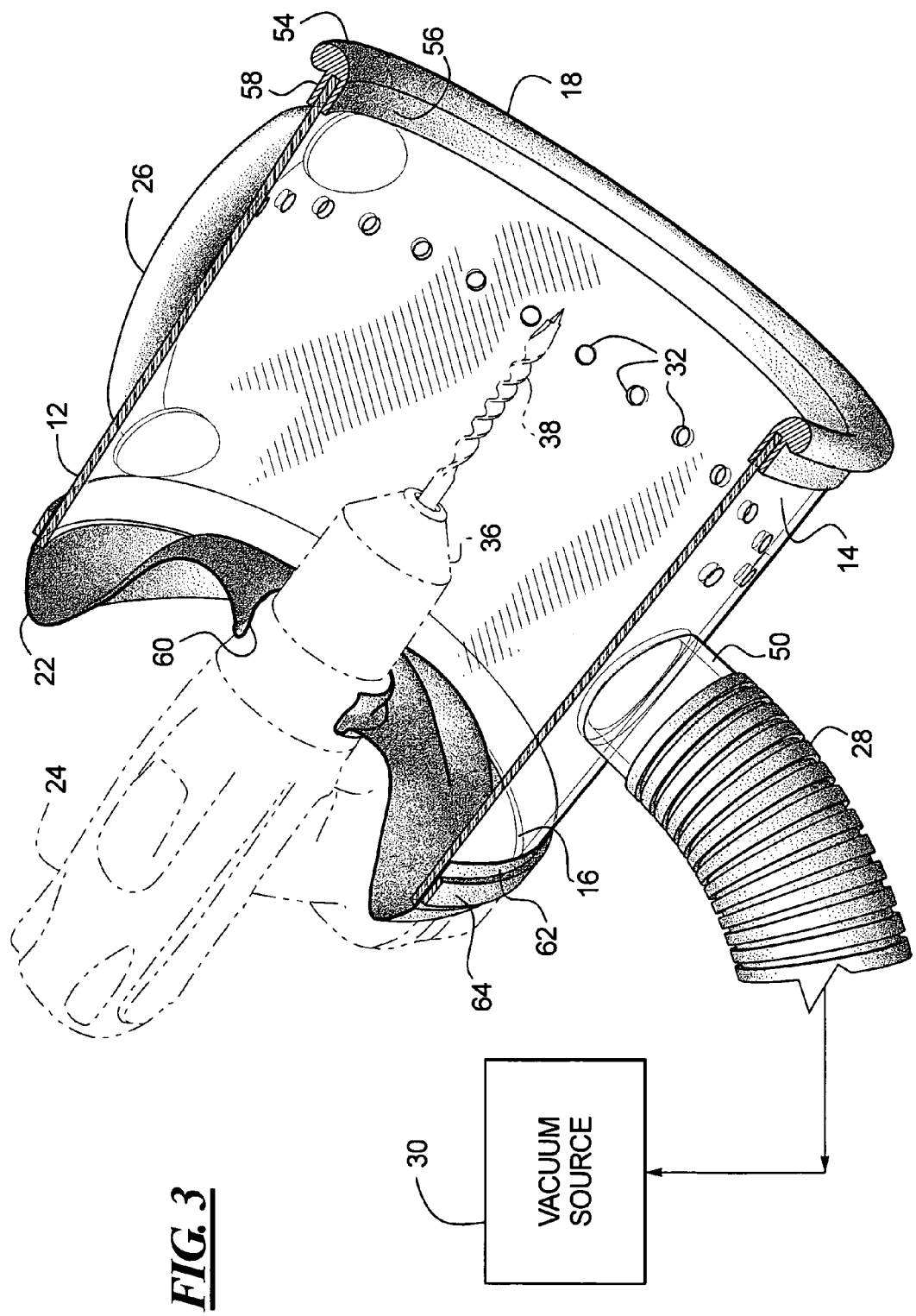
FIG. 3 is a side cross-sectional view of the present apparatus showing the present dust collector with the drill.

With reference to FIG. 3, the cylinder 12 has been cut away to reveal the attachment of the gasket 18 and web 22. The gasket 18 is a flexible rubber or elastomeric seal, one example of which is available from McMaster-Carr. The gasket 18 includes a seal portion 54 extending from the end 14 of the cylinder 12 to provide a readily deformable air-tight member that is pressed against the wall surface 20. The seal portion 54 also prevents marring of finished surfaces. The gasket 18 of the illustrated embodiment is a push-on member that has an inner flange 56 and an outer flange 58 that engage inner and outer wall surfaces, respectively, of the end 14 of the cylinder. Other arrangements of seals may be provided instead. It is also foreseen to form the front portion of the cylinder 12 to flex and deform to provide at least some limiting sealing against the wall 20 if no separate gasket member is used. The scope of the present invention includes an integral gasket or air seal at the forward end of the cylinder.

The cylindrical body 12 of the present device may either be a true cylinder or may have a tapered or conically-shaped body or body portion. In a preferred embodiment, the front end 14 of the cylinder 12 is smaller in diameter than the back end 16. For example, the front or first end 14 is of approximately six inches in diameter whereas the back or second end is of approximately seven inches in diameter to provide a taper to the body of the device. The taper may be even from front to back or may taper only at the front portion of the device. For instance, one embodiment includes a cylindrical member of approximately seven inches in length, and the taper extends over approximately three inches of the front portion of the length from six inches in diameter to seven inches in diameter, with the remaining four inches being cylindrical and of seven inches in diameter. The slight taper helps move dust, debris and drill tailings away from the front of the device and toward the vacuum outlet 50. It also helps to prevent any dust or debris from falling out of the device as drilling is finished and the device is drawn away from the surface 20. Less or greater tapering of the body, or different arrangements of tapered portions of the device are possible.

The cylindrical body 12 of the preferred embodiment is formed of transparent polycarbonate and has a thickness of 0.125 (⅛) inch. The cylindrical body 12 may be molded or cut from cylindrical stock. For instance, it is foreseen to form the cylinder 12 with the holes 32 and an integral handle 26 by injection molding.

The cylindrical body 12 can be in different sizes. For example, a larger version that is 16 inches in diameter may be used for drilling larger holes, for example for drilling five inch or larger holes for lighting fixtures and the like. This large diameter version has a cylinder length of about 12 inches. A small diameter version is also provided for smaller jobs, such as drilling finished millwork for installing locks and hardware. The small diameter version has a diameter of about three inches or three and one half inches and lacks a handle since is can be gripped directly while in use.

The second end 16 of the cylinder 12 includes the flexible sheet or web 22, also referred to as a boot. The web 22 of one embodiment is substantially cone-shaped with a central opening 60 of a size and shape to fit snugly around the front portion of the power drill 24. In one embodiment the opening 60 is one and one half inches in diameter. The opening 60 prevents or at least limits air flow at the body of the drill housing by elastically deforming to grip the drill. The web 22 flexes as the drill 24 is moved to drill holes in the surface 20. The deformation of the cone-shaped web 22 as the drill 24 is moved forward is readily seen in FIG. 3. In the preferred embodiment, the drill 24 may be moved four inches into the body of the cylinder 12 and withdrawn four inches outside the cylinder, for an eight inch total travel. The web 22 forms a seal between the drill 24 and the rear of the cylinder 12.

The web 22 is affixed to the second end 16 of the cylinder 12 in the illustrated embodiment by having a portion 62 stretched thereover. A band 64 is fastened over the stretched portion 62 to hold it in place. Optionally, a glue or sealing agent can be applied. Other attachment means may be provided instead. The web or boot 22 may be replaceable if damaged.

The web or boot 22 of one embodiment is of neoprene rubber. Other materials are also possible. It is desirable that the web or boot 22 be puncture resistant since users will be directing sharp drill bits 38 toward the web 22 as the drill 24 is being inserted into the device. As such, a coating of a puncture resistant material, such as Kevlar, over the flexible air tight material of the web or boot 22 is possible. The web 22 may be formed from a sheet by cutting and fastening and sealing any seam that results. Alternatively, and preferably, the web or boot 22 is molded in one piece. It may have a thickness of about 1/16 inch or about 3/32 inch. The web or boot 22 engages only the drill shank of the drill housing and does not touch the chuck or other rotating parts of the drill. The neoprene material is flexible enough to permit drilling at an angle or movement of the drill laterally for fine tuning of the drill bit placement, thereby insuring that the accurate use of the drill is not compromised during the use of the present device.

A preferred form of the web or boot 22 has a thicker or reinforced portion at the portion 62 where it is fastened to the cylinder 12 and for a short distance past the end 16 where the web or boot flexes. This prevents failure at the location where the greatest amount of flexing is expected during use. A thicker or reinforced portion is also provided at and about the opening 60, as this area receives abrasion and wear each time that the drill 24 is inserted into the opening 60 and withdrawn therefrom.

As is readily apparent from the sectional view of FIG. 3, the holes 32 are located between the first end 14 of the cylinder and the hose connector 50. This ensures that dust and debris at the drill site is entrained in the air flow within the cylinder 12 and carried to the hose connector 50 and out of the device 10 to the vacuum source 30.

Figure 4:
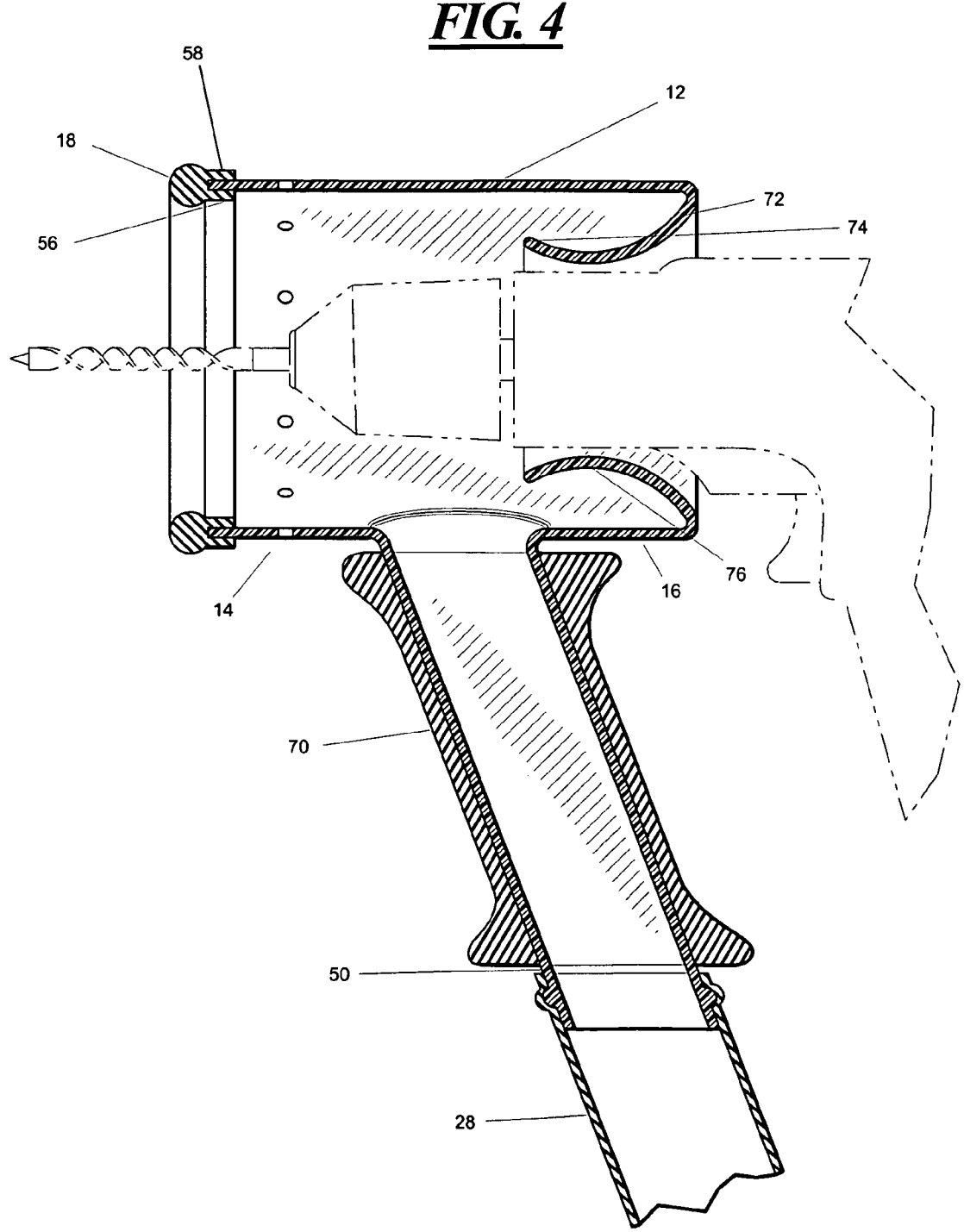
FIG. 4 is a side cross-sectional view of an additional embodiment of the present dust collecting apparatus with the power drill shown in phantom.

In another embodiment of the present invention, seen in cross-sectional view in FIG. 4, the hose outlet 50 is incorporated into a pistol grip handle 70. The cylinder 12 takes substantially the same shape as the cylinder 12 in other embodiments of the invention. The first end 14 of the cylinder 12 in this embodiment includes a gasket 18 that presses against a wall, ceiling, or other surface. The gasket 18 includes a seal portion 54 extending from the end 14 of the cylinder 12 to provide a readily deformable air-tight member that is pressed against the wall surface 20. The seal portion 54 also prevents marring of finished surfaces. The gasket 18 of the illustrated embodiment is a push-on member that has an inner flange 56 and an outer flange 58 that engage inner and outer wall surfaces, respectively, of the end 14 of the cylinder. Other arrangements of seals may be provided instead.

The second end 16 of the cylinder 12 has a narrowing or neck area 72 with a substantially circular opening 74 of a size and shape to permit insertion of the front portion of the power drill 24. In one embodiment, the narrowest point 76 of the narrowing or neck area 72 is approximately 1⅝ inches in diameter. The narrowing or neck area 72 can limit air flow at the body of the drill through formation of the narrowing or neck area 72 in a venturi. The narrowing or neck area 72 is formed as a part of the cylinder 12 in one embodiment, but may be a separate part that fastened to the cylinder 12 in alternative embodiments.

The hose outlet 50 in this embodiment is approximately 1 inch in diameter and is substantially circular in shape. The hose outlet 50 extends through a pistol grip handle 70 and has a ridge or other feature located substantially on the circumference of the hose outlet 50 to engage the hose 28. The incorporation of the hose outlet 50 into the handle 70 of the device provides a different means of manipulating the device while in use.

Thus, there is shown and described a dust collector for a drill or other power tool device. The dust collector prevents marring, scratching or damaging of the surface being drilled so that it can be used on finished surfaces without risk of damage. The gasket around the front end also ensures that dust does not escape into the environment during use. Common and readily available drills and vacuums are used with the present device, so that no special equipment need be provided other than the device itself.

An alternative use of the present device is for drilling and working hazardous materials, where the dust may be harmful if inhaled. For instance, asbestos containing materials or abalone can be worked with the present device with a greatly reduced risk to the user.

Although other modifications and changes may be suggested by those skilled in the art, it is the intention of the inventors to embody within the patent warranted hereon all changes and modifications as reasonably and properly come within the scope of their contribution to the art.

I claim:

1. An apparatus for collecting dust generated by a power tool, comprising:
   a substantially cylindrical body having first and second ends, said substantially cylindrical body being formed of a rigid and substantially transparent material;
   a gasket at a first end of said substantially cylindrical body, said gasket being configured for establishing a seal between the first end of the substantially cylindrical body and a working surface; and
   a web affixed to the second end of said substantially cylindrical body, said web being of an elastic material, said web defining an opening for accepting a front portion of the power tool in snug engagement;
   a vacuum hose connector extending from said substantially cylindrical body for connection to a vacuum hose of a vacuum source; and
   a handle connected to said substantially cylindrical body, said handle being separate from said vacuum hose connector.

2. An apparatus for collecting dust generated by a power tool, comprising:
   a substantially cylindrical body having first and second ends, said substantially cylindrical body being formed of a rigid and substantially transparent material;
   a gasket at a first end of said substantially cylindrical body, said gasket being configured for establishing a seal between the first end of the substantially cylindrical body and a working surface; and
   a web affixed to the second end of said substantially cylindrical body, said web being of an elastic material, said web defining an opening for accepting a front portion of the power tool in snug engagement said web being generally cone-shaped.

3. An apparatus as claimed in claim 1, wherein said cylinder defines a plurality of openings through said cylinder.

4. An apparatus as claimed in claim 1, further comprising:
   a vacuum hose having a first end connected to said vacuum hose connector and having a second end with a fitting for connection to a vacuum source.

5. An apparatus for collecting dust generated by a power tool, comprising:
   a substantially cylindrical body having first and second ends, said substantially cylindrical body being formed of a rigid and substantially transparent material;
   a gasket at a first end of said substantially cylindrical body, said gasket being configured for establishing a seal between the first end of the substantially cylindrical body and a working surface;
   a connection for a vacuum source to said substantially cylindrical body; and
   a neck connected to the second end of said substantially cylindrical body, said neck including a wall portion extending into an interior of said substantially cylindrical body, said neck including an inwardly curved narrowing formed by said wall portion and defining an opening of a predetermined extent for accepting a front portion of the power tool, said wall portion flaring outwardly from said opening of said predetermined extent to an opening of a wider extent, said outwardly flaring wall portion being within said substantially cylindrical body and spaced farther from said second end of said substantially cylindrical body than said opening of said predetermined extent.

6. An apparatus for collecting dust generated by a power tool, comprising:
   a substantially cylindrical body having first and second ends, said substantially cylindrical body being formed of a rigid and substantially transparent material;
   a gasket at a first end of said substantially cylindrical body, said gasket being configured for establishing a seal between the first end of the substantially cylindrical body and a working surface; and
   a web affixed to the second end of said substantially cylindrical body, said web being of an elastic material, said web defining an opening for accepting a front portion of the power tool in snug engagement;
   a handle affixed to said substantially cylindrical body, said handle extending in a direction substantially parallel to an axial direction of said substantially cylindrical body.

7. A dust collector apparatus for use with a power drill, comprising:
   a substantially cylindrical body having a first end and a second end, said substantially cylindrical body having a diameter sufficient to accept at least a forward portion of the power drill, said substantially cylindrical body being formed of a substantially transparent material, said substantially cylindrical body defining a plurality of air holes formed in a sidewall of said substantially cylindrical body;
   a flexible gasket affixed to said first end of said substantially cylindrical body, said flexible gasket having a surface engaging portion adapted to be pressed against a working surface in substantially air tight engagement;
   a hose fitting at said sidewall of said substantially cylindrical body;
   a vacuum hose affixed to said hose fitting and connectable to a vacuum source;
   a boot of a flexible air tight material affixed at said second end of said substantially cylindrical body, said boot having an opening of a size and shape to accept at least the forward portion of the power drill in substantially air tight engagement, said boot being sufficiently flexible to permit drilling movement of the power drill into the working surface while the forward portion of the power drill is accepted into said opening in said boot, said drilling movement bringing the forward portion of the power drill into said substantially cylindrical body; and
   a handle connected to said substantially cylindrical body.

8. A dust collecting apparatus for use with a power drill, comprising:

a substantially cylindrical body having a first end and a second end, said substantially cylindrical body having a diameter sufficient to accept at least a forward portion of the power drill, said substantially cylindrical body being formed of a substantially transparent material, said substantially cylindrical body defining a plurality of air holes formed in a sidewall of said substantially cylindrical body;

a flexible gasket affixed to said first end of said substantially cylindrical body, said flexible gasket having a surface engaging portion adapted to be pressed against a working surface in substantially air tight engagement;

a hose fitting at said sidewall of said substantially cylindrical body;

a vacuum hose affixed to said hose fitting and connectable to a vacuum source;

a boot of a flexible air tight material affixed at said second end of said substantially cylindrical body, said boot having an opening of a size and shape to accept at least the forward portion of the power drill in substantially air tight engagement, said boot being sufficiently flexible to permit drilling movement of the power drill into the working surface while the forward portion of the power drill is accepted into said opening in said boot, said drilling movement bringing the forward portion of the power drill into said substantially cylindrical body, said substantially cylindrical body including a tapered portion.

9. An apparatus as claimed in claim 5, further comprising:
a power drill having a non-rotating forward portion;
said neck being of a size at said predetermined extent to accept said non-rotating forward portion of said power drill.

10. An apparatus as claimed in claim 5, wherein said cylinder defines a plurality of openings through said cylinder.

11. An apparatus as claimed in claim 5, further comprising:
a handle affixed to said substantially cylindrical body.

12. An apparatus as claimed in claim 11, wherein said handle extends in a direction substantially perpendicular to an axial direction of said substantially cylindrical body.

13. An apparatus as claimed in claim 12, wherein said handle is hollow and the opening defined by said handle is connected to an interior space defined by said substantially cylindrical body.

14. An apparatus as claimed in claim 13, further comprising:
a vacuum hose having a first end connected to said handle and having a second end with a fitting for connection to a vacuum source.

* * * * *